United States Patent
Fujinawa et al.

(10) Patent No.: US 6,885,945 B2
(45) Date of Patent: Apr. 26, 2005

(54) METHOD FOR ESTIMATING ORIGIN TIME, HYPOCENTRAL DISTANCE, AND SCALE BASED ON ELECTRIC FIELD OBSERVATION, AND APPARATUS FOR PREDICTION

(75) Inventors: Yukio Fujinawa, Tsukuba (JP); Takumi Matsumoto, Tsukuba (JP); Kozo Takahashi, Tsukuba (JP)

(73) Assignee: National Research Institute for Earth Science and Disaster Prevention, Tsukuba (JP)

( * ) Notice: Subject to any disclaimer, the term of this patent is extended or adjusted under 35 U.S.C. 154(b) by 0 days.

(21) Appl. No.: 10/634,837

(22) Filed: Aug. 6, 2003

(65) Prior Publication Data

US 2004/0093162 A1 May 13, 2004

(30) Foreign Application Priority Data

Nov. 8, 2002 (JP) .................................. 2002-325538

(51) Int. Cl.$^7$ ................................................ G01V 1/28
(52) U.S. Cl. ........................................................ 702/15
(58) Field of Search .............................................. 702/15

(56) References Cited

U.S. PATENT DOCUMENTS

| 4,837,582 A | * | 6/1989 | Takahashi et al. | ........... 343/719 |
| 4,904,943 A | * | 2/1990 | Takahashi | ................... 324/344 |
| 5,694,129 A | * | 12/1997 | Fujinawa et al. | ............. 342/22 |

\* cited by examiner

*Primary Examiner*—Donald McElheny, Jr.
(74) *Attorney, Agent, or Firm*—Westerman, Hattori, Daniels & Adrian, LLP

(57) ABSTRACT

An apparatus for estimating the origin time, the hypocentral distance, and the scale from time-series measured data of the electric field intensity which is observed accompanying a seismic ground motion, comprising a measuring means 21, 22 for measuring the electric field intensity, a data storing means 24, 25 for collecting and storing measured data from the measuring means, and a data analyzing means 26 for analyzing measured data stored in the storing means to detect origin time from the starting time of electric field increase, and to predict the hypocentral distance and the magnitude from the elapsed time from said origin time and said measured data, is provided.

6 Claims, 2 Drawing Sheets

(A) ELECTRIC FIELDS RECORDED AT HASAKI (DISTANCE FROM CHOSHI: 11 KM)

(B) ACCELERATIONS RECORDED AT CHOSHI (ARRIVAL TIME OF P WAVE IS ADJUSTED TO COINCIDE WITH THAT OF HASAKI)

METHOD FOR ESTIMATING ORIGIN TIME, HYPOCENTRAL DISTANCE, AND SCALE BASED ON ELECTRIC FIELD OBSERVATION, AND APPARATUS FOR PREDICTION

BACKGROUND OF THE INVENTION

The present invention relates to a method for estimating the origin time, the hypocentral distance, and the scale of an earthquake from time-series data of measured values of the electric field intensity which is observed accompanying the seismic ground motion, and to an apparatus for the prediction.

In the prior art, the origin time, the hypocentral distance, and the scale of an earthquake are calculated based on the measurements of only P wave, or both P wave and S wave. It is necessary for calculation of these values to measure P wave of the same earthquake at four or more observation sites, when P wave only is used. Even when both P wave and S wave are used, it is necessary to measure P wave and S wave of the same earthquake at three or more observation sites.

For example, in case the hypocentral distances of the four p wave observation sites are 100 km or shorter, the calculation of the origin time (time of earthquake occurrence), the hypocentral distances (distance from the hypocenter to the observation sites), and the scale (magnitude M) requires at least 15 seconds, which is a time P wave requires to arrive at the observation sites. However, as a typical observation uses both P wave and S wave, the calculation requires at least 25 seconds, which is a time S wave requires to arrive at the observation sites in case the hypocentral distances of the three observation sites are 100 km or shorter. No matter which method is used, the hypocentral distance and the scale can not be known until seismic waves arrive at three or four observation sites, that is, for 15 or 25 seconds after the occurrence of the earthquake in the above described cases.

SUMMARY OF THE INVENTION

It is an object of the present invention to resolve the aforementioned problem by providing a simple method and an apparatus which enable to detect the origin time almost simultaneously with the occurrence of the earthquake, while quickly estimating the hypocentral distance and the scale before the arrival of seismic waves.

For this end, the method of the present invention is a method for estimating the origin time, the hypocentral distance, and the scale from time-series data of measured values (measured data) of the electric field intensity which is observed accompanying a seismic ground motion, and is characterized by comprising collecting and storing the measured data of the electric field intensity, detecting the origin time from the starting time of electric field increase, and estimating the hypocentral distance and the scale from the elapsed time from the origin time and the measured data.

The apparatus of the present invention is an apparatus for estimating the origin time, the hypocentral distance, and the scale from time-series measured data of the electric field intensity which is observed accompanying a seismic ground motion, and is characterized by comprising a measuring means for measuring the electric field intensity, a data storing means for collecting and storing measured data from said measuring means, and a data analyzing means for analyzing data stored in said storing means to detect the origin time from the starting time of electric field increase and to predict the hypocentral distance and the scale from the elapsed time from the origin time and the measured data.

It is further characterized in that the hypocentral distance D and the scale M are predicted from a relation between the elapsed time t from said origin time and an electric field intensity E(t) at the time t, by using two or more measured data based on the following formula:

$$E(t) = a 10^M / \{D - r(t)\}^b$$

wherein a, b: constants which depend on geology and electric field observing system; and r(t): distance between hypocenter and P wave front at time t=t×Speed of P wave, and that the origin time, the hypocentral distance, and the scale are predicted by using a seismograph for measuring seismic waves together with the above.

Still other objects and advantages of the invention will in part be obvious and will in part be apparent from the specification.

The invention accordingly comprise the features of construction, combinations of elements, and arrangement of parts which will be exemplified in the construction hereinafter set forth, and the scope of the invention will be indicated in the claims.

DETAILED DESCRIPTION OF THE PREFERRED EMBODIMENTS

Figure 1:
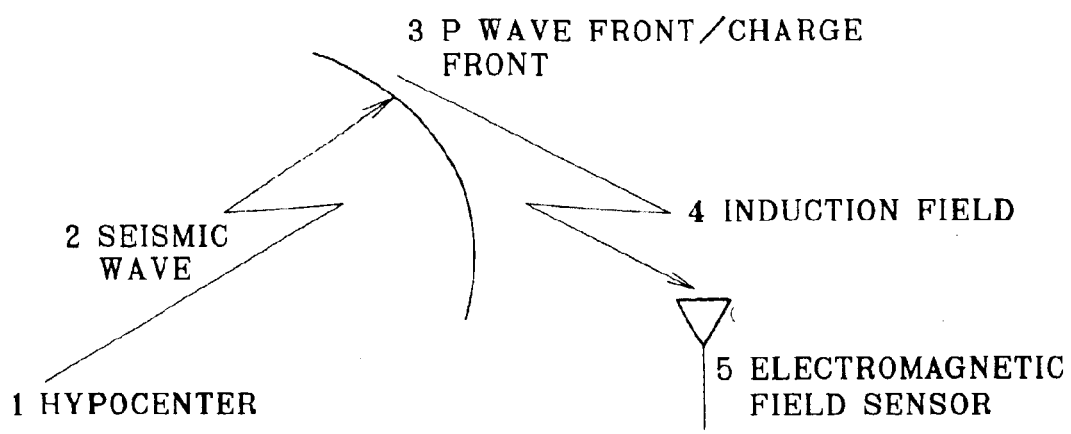
FIG. 1 is an illustration for explaining an embodiment of the method according to the present invention for estimating the origin time, the hypocentral distance, and the scale based on the electric field observation.

An embodiment of the present invention will be described hereinafter with reference to the drawings. FIG. 1 is an illustration for explaining an embodiment of the method according to the present invention for estimating the origin time, the hypocentral distance, and the scale based on the electric field observation. In FIG. 1, numeral 1 designates a hypocenter, 2 designates a seismic wave propagating from the hypocenter, 3 designates a wave front which represents P wave front and a charge front at once. Numeral 4 designates an induction field induced by the charge front, and 5 designates an electromagnetic field sensor for measuring the electric field.

As shown in FIG. 1, a seismic wave 2 arises at hypocenter 1 simultaneously with the occurrence of an earthquake and propagates from the hypocenter. As P wave is the fastest to propagate, the wave front of seismic wave comprises the p wave front. P wave is a longitudinal wave, and its wave front comprises a charge front 3. The charge front 3 induces an electric field resulting in the propagation of an induction field 4.

As will be described later in an observation example, the induction field 4 arises simultaneously with the occurrence of an earthquake, increases its intensity synchronously with the propagation of the P wave, and reaches the maximum at the arrival of P wave. The electric field decreases from the arrival time of P wave to the arrival of S wave, no electric field synchronized with S wave propagation being observed. No electric field pulse due to P wave is observed, while electric field pulse is generated at the arrival time of S wave.

The intensity of the induction field 4 can be measured by an electromagnetic sensor 5 and the measured data can be analyzed to detect origin time from the starting time of the electric field increase, and to predict the hypocentral distance and the scale (magnitude M) from the elapsed time from the origin time and the measured data from the electromagnetic sensor 5.

Assuming that a charge is generated on the wave front of P wave, the wave form of the induction field 4 synchronized with the P wave propagation can be quantitatively explained with the induction field. Observation shows that its amplitude is nearly inversely proportional to square of the distance from P wave front to the electric field observation site. The magnitude M is often defined as common logarithm of the maximum velocity amplitude of a seismic ground motion. In addition, since flow potential and piezoelectric charge are proportional to the maximum velocity amplitude, if the charge is due to flow potential or piezoelectric charge, the field should be proportional to the M-th power of 10. Therefore, the magnitude M can be obtained from the following formula:

$$E(t) = a 10^M / \{D - r(t)\}^b$$

where E(t): field intensity at elapsed time t from origin time;

a, b: constants which depend on geology and electric field observing system;

D: hypocentral distance; and r(t): distance between hypocenter and P wave front at time t=t×Speed of P wave.

The above formula shows that the magnitude M and the hypocentral distance D can be predicted even before the arrival of P wave, from the relation between elapsed time t from the origin time (starting time of electric field increase) and electric field amplitude (electric field intensity) E. That is, the above formula having the magnitude M and the hypocentral distance D as unknown values can be solved when two or more measured data of field intensity E(t) at time t are available, thus obtaining the magnitude M and the hypocentral distance D. Supposing a sampling cycle of 0.1 second, 10 measured data can be obtained in 5 seconds after the occurrence of an earthquake. This allows a seismic ground motion to be predicted in several seconds, i.e. prior to the arrival of P wave, cutting the time conventionally required for the prediction by 10 seconds or more in the previously described case. Therefore, the prediction prior to the arrival of seismic waves becomes possible in most of the local regions.

Figure 2:
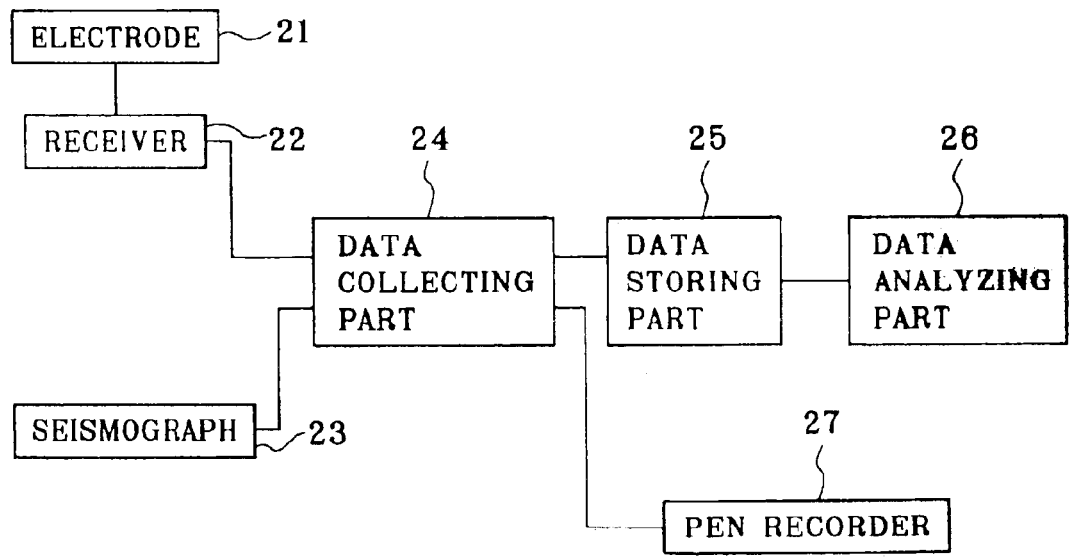
FIG. 2 is a diagram showing a constitution example of an apparatus for estimating the origin time, the hypocentral distance, and the scale according to the present invention.

Now, the constitution of the observation apparatus and its operation will be described. FIG. 2 is a diagram showing a constitution example of the apparatus for estimating the origin time, the hypocentral distance, and the scale according to the present invention. Numeral 21 designates an electrode, 22 designates a receiver, 23 designates a seismograph, 24 designates a data collecting part, 25 designates a data storing part, 26 designates a data analyzing part, and 27 designates a pen recorder.

In FIG. 2, the electrode 21 outputs a potential difference between electrodes. The receiver 22 decreases the output voltage in the unnecessary bands contained in the output voltage received from the electrode 21, while amplifying the output voltage in the necessary bands to a necessary voltage (typically lower than 10 V). The seismograph 23 converts the amplitudes of acceleration and the like due to seismic wave into voltage to output. The data collecting part 24 collects measured data from the receiver 22 and the seismograph 23 at a predetermined sampling cycle (0.1 second or less). The data storing part 25 stores the collected data in memory means after determining whether the data are useful or not.

The data analyzing part 26 analyzes collected and stored data in the memory means of the data storing part 25, detecting the electric field occurring simultaneously with the earthquake, estimating the origin time from the starting time of the electric field increase, and estimating the hypocentral distance and the scale from the elapsed time from the origin time and the measured data, and outputs the results. The pen recorder 27 monitors the measurements of the electrode 21, the receiver 22, and the seismograph 23. When using the measured data from the seismograph 23, P wave is detected and the hypocentral distance and the scale are predicted from the measured data of P wave and the measured data of the electric field intensity.

Figure 3A:
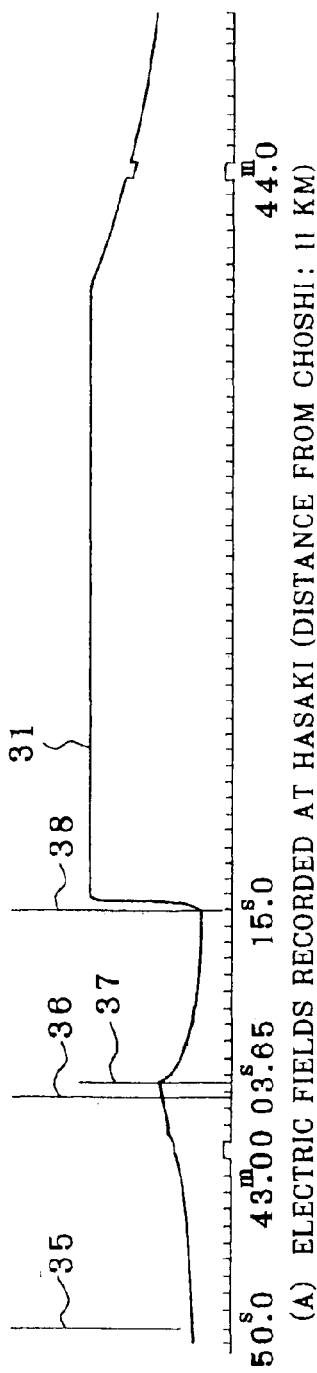
FIGS. 3(A), 3(B) are graphs showing an observation example of the electric field generated simultaneously with an earthquake, and P wave of the same earthquake.
Figure 3B:
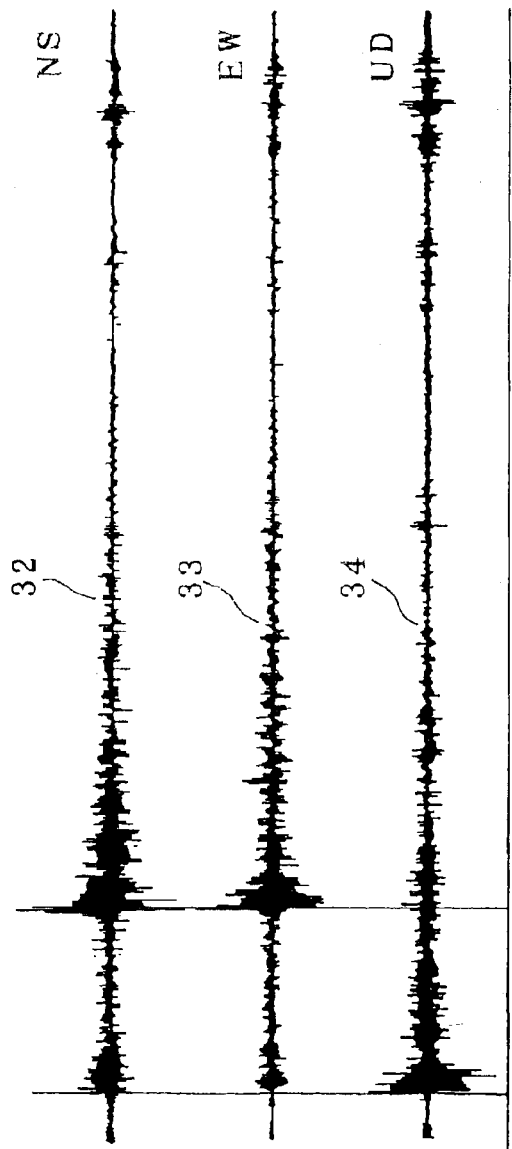

Now, the processing of the measured data will be specifically described with reference to an observation example. FIGS. 3(A), 3(B) are graphs showing an observation example of the electric field generated simultaneously with an earthquake, and P wave of the same earthquake. The example relates to an earthquake which actually occurred on Jun. 14, 2002, as is shown in the following table. The curves are shown in relation with time in order to predict the origin time, the hypocentral distance, and the scale of this earthquake. Numeral 31 designates the electric field which arises simultaneously with the earthquake, 32 designates the acceleration in south-north direction, 33 designates the acceleration in east-west direction, 34 designates acceleration in perpendicular direction, 35 designates origin time, 36 indicates the arrival time of P wave, 37 designates a singular point in the electric field intensity, and 38 designates the starting time of the electric field pulse increase due to the arrival of S wave.

The Earthquake in the Southwest Region of Ibaragi Prefecture on Jun. 14, 2002

Hypocenter: 36°.237 N, 139°.983 E, depth: 57 km
Magnitude: 4.9
Observed electric field and time of earthquake

| | |
|---|---|
| Starting time of field increase | 11:42 49.0 sec. |
| Origin time (calculated value) | 11:42 49.99 sec. |
| Field maximum time | 11:43 04.4 sec. |
| | (Maximum: 0.45 mV) |
| Arrival time of P wave | 11:43 03.65 sec. |

(Time difference of 0.75 sec. between field maximum and the arrival of P wave corresponds to length of hypocentral region)

| | |
|---|---|
| Starting time of field impulse increase | 11.43 15.0 sec. |
| | (Maximum: 12 mV) |

Arrival time of S wave (calculated value) 11.43 14.0 sec.
Observation site: 402 Ootaoshiage, Hasaki-cho, Ibaragi Prefecture 35°49'.73 N, 140°43'.94 E
Epicentral distance: 78.4 km Hypocentral distance: 98 km
Observation frequency: 0–0.7 Hz, 0.01–0.7 Hz Electrode: A steel pipe of 805 m inserted in a perpendicular drilling and copper wires buried around it.

Recorder: San-ei 8D20A available, Recording speed: 2 mm/sec.

Recording sensitivity: 1 mV/cm

Toa-Pegasus INR-6041, Recording speed: 30 mm/H

Recording sensitivity: 10 mV/2.5 cm

According to the above described observation example, the electric field 31 generated simultaneously with the earthquake continued to exist until the seismic waves became unobservable. All of the acceleration records including acceleration in south-north direction 32, the acceleration in east-west direction 33, and acceleration in perpendicular direction 34 are recorded by a strong motion seismograph installed in Choshi located at 14 km southeast of the electric field observation site (Hasaki). The origin time 35 (calculated value) coincides with the starting time of electric field increase, that is 11:42 49.0 sec., within the range of the calculation error. The arrival time of P wave 36 is an observation value of high sensitivity seismograph installed at the electric field observation site (Hasaki) The singular point 37 in the electric field intensity curve is a point at which the field curve turns from increase to decrease. The starting time of field pulse increase 38 coincides with the arrival time of S wave in FIG. 2. However, this is an observation data obtained in Choshi which is at a distance of 11 km from the electric field observation site (Hasaki), and the actual arrival time of S wave at Hasaki is 1 second earlier than the starting time of field pulse increase 38. This difference of 1 second is due to a phase delay of induced voltage induced by the transverse wave of S wave.

In the case of the above-described observation example, the hypocentral distance 98 km is obtained from a product of time difference 13.7 seconds between the arrival time of P wave 36 and the origin time 35, and the P wave propagation speed 7.2 km/second. The scale can be obtained according to the prior art from the relation between the hypocentral distance and the amplitude of seismic wave. However, it can be obtained also from a difference between the arrival time of P wave 36 and the singular point of electric field 37, in the following manner. In the case of the present observation example, this difference is 0.8 second, which is multiplied by the propagation speed of P wave to give the length of the hypocentral region 5 km, which corresponds to a hypocentral region length of an earthquake with magnitude 5 (typical magnitude error is 0.5).

As the amplitude of the electric field (electric field intensity) increases with the magnitude, and is inversely proportional to square of the distance between the wave front of P wave and the electric field observation site, the magnitude and the hypocentral distance can be predicted prior to the arrival of P wave, from the relation between the elapsed time from the origin time 35 (starting time of field increase) and the electric field amplitude. Thus, the above described formula having magnitude and hypocentral distance as unknown values, can be solved when two or more measured values of the electric field amplitude E(t) at time t as elapsed time from the origin time 35 are available, so as to uniquely obtain the magnitude and the hypocentral distance. Accordingly, the magnitude and the hypocentral distance can be predicted in several seconds after the occurrence of the earthquake, i.e. prior to the arrival of seismic waves.

The measurement of the electric field intensity by the electromagnetic sensor 5 in this embodiment is preferably performed at a place where the level of both natural noise and artificial noise are sufficiently low. For instance, as the electric field accompanying the earthquake is in the order of 0.4 $\mu$V/m, it is preferable that the natural noise and the artificial noise are in the order of 0.1 $\mu$V/m or lower in 0.01–30 Hz band which is regarded to be an optimum observation band.

In addition, the present invention is not limited to above-described embodiment, and various modifications may be made. For example, though the origin time, the hypocentral distance, and the scale are predicted at a single observation site in the embodiment, the conventional technique using P wave and S wave may be applied in order to obtain the hypocenter location from the hypocentral distance.

As apparent from the above discussion, according to the present invention, the method for estimating the origin time, the hypocentral distance, and the scale from the time-series measured data of the electric field intensity which is observed accompanying a seismic ground motion comprise collecting and storing measured data of the electric field intensity, detecting the origin time from the starting time of electric field increase, and estimating the hypocentral distance and the scale from the elapsed time from the origin time and the measured data. In addition, the apparatus for estimating the origin time, the hypocentral distance, and the scale from time-series measured data of the electric field intensity which is observed accompanying a seismic ground motion comprises a measuring means for measuring the electric field intensity, a data storing means for collecting and storing measured data from the measuring means, and a data analyzing means for analyzing the measured data stored in the storing means, to detect the origin time from the starting time of electric field increase, and to predict the hypocentral distance and the magnitude from the elapsed time from said origin time and the measured data. Hence, the origin time, the hypocentral distance, and the scale can be quickly predicted prior to the arrival of seismic waves by measuring and analyzing the electric field intensity.

Accordingly, the present invention can be utilized for emergency stopping of installations such as nuclear reactor, high-speed railway, high-speed motor road, and airport, prior to the arrival of the seismic waves.

What we claim is:

1. A method for estimating the origin time, the hypocentral distance, and the scale from time-series measured data of the electric field intensity which is observed accompanying a seismic ground motion, the method comprising collecting and storing measured data of the electric field intensity; detecting estimating the origin time from the starting time of electric field increase; and estimating the hypocentral distance and the scale from the elapsed time from said origin time and said measured data.

2. A method as claimed in claim 1, wherein the hypocentral distance D and the scale M are predicted from the relation between the elapsed time t from said origin time and an electric field intensity E(t) at the time t, by using two or more measured data based on the following formula:

$$E(t) = a 10^M / \{D - r(t)\}^b$$

where a, b: constants which depend on geology and electric field observing system; and r(t): distance between hypocenter and P wave front at time t=t×Speed of P wave.

3. A method as claimed in claim 1 or 2, wherein the original time, the hypocentral distance, and the scale are predicted by also using a seismograph for measuring seismic waves.

4. An apparatus for estimating the origin time, the hypocentral distance, and the scale from time-series measured data of the electric field intensity which is observed accompanying a seismic ground motion, the apparatus comprising a measuring means for measuring the electric field intensity; a data storing means for collecting and storing measured data from said measuring means; and a data analyzing means for analyzing measured data stored in said storing means to estimate the origin time from the starting time of electric field increase and to predict the hypocentral distance and the scale from the elapsed time from said origin time and said measured data.

5. An apparatus as claimed in claim 4, wherein said analyzing means predicts the hypocentral distance D and the scale M from the relation between the elapsed time t from said origin time and an electric field intensity E(t) at the time t, by using two or more measured data based on the following formula:

$$E(t)=a10^M/\{D-r(t)\}^b$$

where a, b: constants which depend on geology and electric field observing system; and r(t): distance between hypocenter and P wave front at time t=t×Speed of P wave.

6. An apparatus as claimed in claim 4 or 5, further comprising a seismograph for measuring seismic waves, wherein said data analyzing means predicts the origin time, the hypocentral distance, and the scale by also using measured data of said seismograph together with the other data.

* * * * *